US011632268B2

(12) United States Patent
Sridhar et al.

(10) Patent No.: US 11,632,268 B2
(45) Date of Patent: Apr. 18, 2023

(54) GENERATING ROUTE TARGET VALUES FOR VIRTUAL PRIVATE NETWORK ROUTES

(71) Applicant: Juniper Networks, Inc., Sunnyvale, CA (US)

(72) Inventors: Sandeep Sridhar, Bangalore (IN); Ganesha Hebbale Venkatasubbaiah, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/301,276

(22) Filed: Mar. 30, 2021

(65) Prior Publication Data

US 2022/0321382 A1     Oct. 6, 2022

(51) Int. Cl.
*H04L 12/46*      (2006.01)
*H04L 49/25*      (2022.01)
*H04L 69/324*     (2022.01)

(52) U.S. Cl.
CPC .......... *H04L 12/4683* (2013.01); *H04L 49/25* (2013.01); *H04L 69/324* (2013.01)

(58) Field of Classification Search
CPC .... H04L 12/4683; H04L 49/25; H04L 69/324
See application file for complete search history.

(56) References Cited

U.S. PATENT DOCUMENTS 9,984,245 B2 * 5/2018 Schmitt .................. H04L 63/10
10,826,775 B1    11/2020 Moreno et al.
11,329,882 B2 * 5/2022 Christober ........... H04L 41/0816
2017/0034050 A1 * 2/2017 Sunavala ................. H04L 45/74
2019/0222511 A1 * 7/2019 Lokman ................ H04L 47/726
(Continued)

FOREIGN PATENT DOCUMENTS

EP    3058779 A1    8/2016
EP    3264691 A1    1/2018
(Continued)

OTHER PUBLICATIONS

Rosen et al., "BGP/MPLS IP Virtual Private Networks (VPNs)," Network Working Group, RFC 4364, Feb. 2006, 48 pp.
(Continued)

*Primary Examiner* — Mohamed A. Wasel
(74) *Attorney, Agent, or Firm* — Shumaker & Sieffert, P.A.

(57) ABSTRACT

Compute nodes can execute virtual routers to implement a forwarding plane for one or more virtual networks having virtual network destinations hosted by the compute nodes. In one example, a method includes generating, by a software-defined networking (SDN) controller that manages a plurality of compute nodes, based on a unique identifier of a virtual network, a route target value for the virtual network, wherein the virtual network comprises virtual network endpoints executing on the compute nodes; and outputting, by the SDN controller and to a routing protocol peer device, a virtual private network (VPN) route that includes the route target value for the virtual network and a virtual network prefix associated with the virtual network, the VPN route for routing to the plurality of compute nodes executing the virtual network endpoints of the virtual network.

20 Claims, 9 Drawing Sheets

(56) References Cited

U.S. PATENT DOCUMENTS

2022/0021613 A1* 1/2022 Venkatasubbaiah ........................ H04L 45/586

FOREIGN PATENT DOCUMENTS

WO 2013184846 A1 12/2013
WO 2020212998 A1 10/2020

OTHER PUBLICATIONS

Mackie et al., "BGP-Signaled End-System IP/VPNs draft-ietf-13vpn-end-system-06," Network Working Group, Internet-Draft, Dec. 15, 2016, 31 pp.
Bates et al., "Multiprotocol Extensions for BGP-4," Network Working Group, RFC 4760, Jan. 2007, 13 pp.
Saint-Andre, "Extensible Messaging and Presence Protocol (XMPP): Core," RFC 6120, Internet Engineering Task Force (IETF), Mar. 2011, 211 pp.
Hopps, "Analysis of an Equal-Cost Multi-Path Algorithm," RFC 2992, Network Working Group, Nov. 2000, 8 pp.
U.S. Appl. No. 16/933,684, filed Jul. 20, 2020, Juniper Networks, Inc. (inventor: Venkatasubbaiah) entitled Generating Route Distinguishers for Virtual Private Network Addresses Based on Physical Hardware Addresses.
Extended Search Report from counterpart European Application No. 21182064.2 dated Dec. 1, 2021, 7 pp.

* cited by examiner

GENERATING ROUTE TARGET VALUES FOR VIRTUAL PRIVATE NETWORK ROUTES

TECHNICAL FIELD

The disclosure relates to computer networks and, more particularly, to controlling packet forwarding within virtual networks.

BACKGROUND

In a typical cloud data center environment, there is a large collection of interconnected servers that provide computing functionality (e.g., compute nodes) and/or storage capacity (e.g., storage nodes) to run various applications. For example, a data center comprises a facility that hosts applications and services for customers of the data center. The data center for example, hosts all the infrastructure equipment, such as networking and storage systems, redundant power supplies, and environmental controls. In a typical data center, clusters of servers are interconnected via a high-speed switch fabric provided by one or more tiers of physical network switches and routers. More sophisticated data centers provide infrastructure spread throughout the world with subscriber support equipment located in various physical hosting facilities.

Software Defined Networking (SDN) platforms may be used in data centers and, in some cases, may use a logically centralized and physically distributed SDN controller and a distributed forwarding plane in virtual routers that extend the network from physical routers and switches in the data center into a virtual overlay network hosted in virtualized servers (referred to as compute nodes). The SDN controller provides management, control, and analytics functions of a virtualized network and orchestrates the virtual routers by communicating with the virtual routers.

SUMMARY

In general, this disclosure describes techniques for improving route advertisements, such as in software defined networking systems. Compute nodes may execute virtual routers to implement a forwarding plane for one or more virtual networks having virtual network destinations hosted by the compute nodes. In some examples, the virtual network destinations are virtual workloads. The control nodes of SDN controllers and the virtual routers of the compute nodes communicate to share information to control forwarding of tenant traffic within the virtual networks to reach these virtual network destinations. Compute nodes and control nodes associated with different SDN controllers may be arranged in SDN system clusters.

SDN controllers and the virtual routers use virtual routing and forwarding instances (VRFs) to isolate and manage routing information for different virtual networks. The control nodes of an SDN controller use route targets to control the import and export of advertised routes, which are referred to herein as virtual private network (VPN) routes to denote an association with particular virtual networks. For example, a control node will attach a route target extended community (with a route target value) to every VPN route advertised by the control node, and a receiving control node or virtual router will import the VPN route into a VRF if only if the route target value in the route advertisement matches the import route target of the VRF.

The disclosure describes techniques for generating and encoding route targets for virtual private network (VPN) routes using unique identifiers of virtual networks. For example, a control node of a Software Defined Networking (SDN) controller generates a route target that is based on a unique identifier assigned to a virtual network upon creation of the virtual network. The unique identifier may be a universally unique identifier (UUID) generated by an orchestration system for a virtualization infrastructure. The virtual network includes virtual network endpoints executing on compute nodes managed by the SDN controller. The techniques of this disclosure may improve forwarding of traffic flows within SDN platforms. For example, the techniques enable an SDN controller to advertise routes in a manner that avoids a receiving device from unintentionally receiving duplicate routes that can cause routing problems in a distributed SDN platform.

The techniques of this disclosure may provide one or more technical advantages. For example, generating the route targets based on the unique identifier of a virtual network may prevent SDN controllers for different SDN clusters from inadvertently generating and using the same route target value for different virtual networks. Where such SDN controllers/clusters are operated in a federated manner and therefore advertise VPN routes using IBGP in the same autonomous system, this route target collision may otherwise cause unintentional route leaking and therefore unintentional forwarding of traffic between the different virtual networks. Generating and using route target values that are unique not only within each SDN cluster, but also among the multiple SDN clusters, may allow the SDN controllers to avoid this scenario. In addition, the techniques described herein for generating route target values may provide improved security, because route target values according to the techniques may be much less likely to be guessed by a third party that could otherwise compromise network security by injecting traffic into the networks.

In one example, a method includes generating, by a software-defined networking (SDN) controller that manages a plurality of compute nodes, based on a unique identifier of a virtual network, a route target value for the virtual network, wherein the virtual network comprises virtual network endpoints executing on the compute nodes; and outputting, by the SDN controller and to a routing protocol peer device, a virtual private network (VPN) route that includes the route target value for the virtual network and a virtual network prefix associated with the virtual network, the VPN route for routing to the plurality of compute nodes executing the virtual network endpoints of the virtual network.

In another example aspect, an SDN controller includes processing circuitry in communication with a memory, the processing circuitry being configured to: generate, based on a unique identifier of a virtual network, a route target value for the virtual network, wherein the virtual network comprises virtual network endpoints executing on one or more of a plurality of compute nodes managed by the SDN controller; and output, to a routing protocol peer device, a VPN route that includes the route target value for the virtual network and a virtual network prefix associated with the virtual network, the VPN route for routing to the plurality of compute nodes executing the virtual network endpoints of the virtual network.

In a further example aspect, a computer-readable storage medium includes instructions that, when executed, cause one or more processors of an SDN controller to: generate, based on a unique identifier of a virtual network, a route target value for the virtual network, wherein the virtual network comprises virtual network endpoints executing on one or more of a plurality of compute nodes managed by the SDN controller; and output, to a routing protocol peer device, a VPN route that includes the route target value for the virtual network and a virtual network prefix associated with the virtual network, the VPN route for routing to the plurality of compute nodes executing the virtual network endpoints of the virtual network.

The details of one or more examples are set forth in the accompanying drawings and the description below. Other features, objects, and advantages will be apparent from the description and drawings, and from the claims.

BRIEF DESCRIPTION OF DRAWINGS

Like reference characters denote like elements throughout the figures and text.

DETAILED DESCRIPTION

Figure 1:
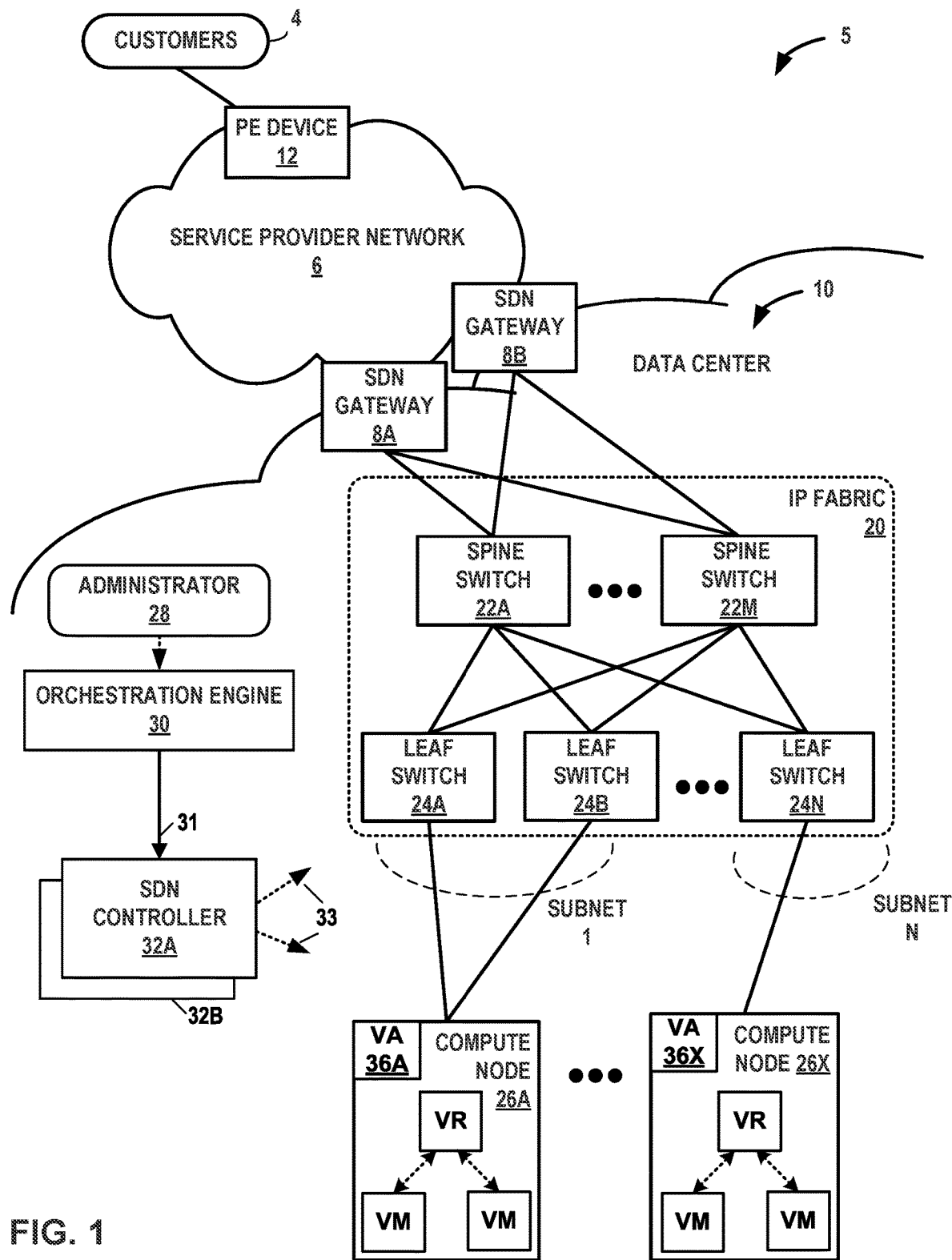
FIG. 1 is a block diagram illustrating an example network system having a data center in which examples of the techniques described herein may be implemented.

FIG. 1 is a block diagram illustrating an example network system 5 having a data center 10 in which examples of the techniques described herein may be implemented. In network system 5, SDN controllers 32A-32B ("SDN controllers 32"), compute nodes 26A-26X ("compute nodes 26"), SDN gateways 8A-8B ("SDN gateways 8"), and nodes of Internet Protocol (IP) fabric 20 operate in accordance with the techniques described herein to ensure customer traffic flow and customer applications executing within the cloud data center continue without interruption.

In general, data center 10 provides an operating environment for applications and services for customers 4 coupled to the data center 10 by service provider network 6. Customers 4 are coupled to service provider network 6 by provider edge (PE) device 12. Data center 10 hosts infrastructure equipment, such as networking and storage systems, redundant power supplies, and environmental controls. Service provider network 6 may be coupled to one or more networks administered by other providers, and may thus form part of a large-scale public network infrastructure, e.g., the Internet.

In some examples, data center 10 may represent one of many geographically distributed network data centers. As illustrated in the example of FIG. 1, data center 10 is a facility that provides network services for customers 4. Customers 4 may be collective entities such as enterprises and governments or individuals. For example, a network data center may host web services for several enterprises and end users. Other example services may include data storage, virtual private networks, traffic engineering, file service, data mining, scientific- or super-computing, and so on. In some examples, data center 10 is an individual network server, a network peer, or otherwise.

In this example, data center 10 includes a set of storage systems and application servers interconnected via an IP fabric 20 provided by one or more tiers of physical network switches and routers. Compute nodes 26 are servers that function as compute nodes of the data center. In some examples, the terms "compute nodes" and "servers" are used interchangeably herein to refer to compute nodes 26. For example, each of compute nodes 26 may provide an operating environment for execution of one or more customer-specific virtual machines ("VMs" in FIG. 1). IP fabric 20 is provided by a set of interconnected leaf switches 24A-24N (collectively, "leaf switches 24") coupled to a distribution layer of spine switches 22A-22M (collectively, "spine switches 22"). Leaf switches 24 may also be referred to as top-of-rack (TOR) switches. Spine switches 22 may also be referred to as spine switches. Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, leaf switches 24 and spine switches 22 provide compute nodes 26 with redundant (multi-homed) connectivity to IP fabric 20. Spine switches 22 aggregate traffic flows and provides high-speed connectivity between leaf switches 24. Leaf switches 24 are network devices that provide layer two (e.g., MAC) and/or layer 3 (e.g., IP) routing and/or switching functionality. Leaf switches 24 and spine switches 22 each include one or more processors and a memory, and that are capable of executing one or more software processes. SDN gateways 8, also referred to as gateway routers, are routing devices that perform layer 3 routing to route network traffic between data center 10 and customers 4 by service provider network 6. SDN gateways 8 provide redundant gateways to forward and receive packets between IP fabric 20 and service provider network 6.

SDN controller 32A provides a logically, and in some cases physically, centralized controller for facilitating operation of one or more virtual networks within data center 10 in accordance with one or more examples of this disclosure. The terms SDN controller and Virtual Network Controller ("VNC") may be used interchangeably throughout this disclosure. In some examples, SDN controller 32A operates in response to configuration input received from orchestration engine 30 via northbound Application Programming Interface (API) 31, which in turn operates in response to configuration input received from administrator 28. Additional information regarding SDN controller 32A operating in conjunction with other devices of data center 10 or other software-defined network is found in International Application Number PCT/US2013/044378, filed Jun. 5, 2013, and entitled PHYSICAL PATH DETERMINATION FOR VIR- TUAL NETWORK PACKET FLOWS, which is incorporated by reference as if fully set forth herein.

In some examples, orchestration engine 30 manages functions of data center 10 such as compute, storage, networking, and application resources. For example, orchestration engine 30 may create a virtual network for a tenant within data center 10 or across data centers. Orchestration engine 30 may attach virtual machines (VMs) to a tenant's virtual network. Orchestration engine 30 may connect a tenant's virtual network to some external network, e.g., the Internet or a VPN. Orchestration engine 30 may implement a security policy across a group of VMs or to the boundary of a tenant's network. Orchestration engine 30 may deploy a network service (e.g., a load balancer) in a tenant's virtual network.

In some examples, SDN controller 32A manages the network and networking services such load balancing, security, and allocating resources from compute nodes 26 to various applications via southbound API 33. That is, southbound API 33 represents a set of communication protocols utilized by SDN controller 32A to make the actual state of the network equal to the desired state as specified by orchestration engine 30. One such communication protocol may include a messaging protocol such as Extensible Messaging and Presence Protocol (XMPP), for example. For example, SDN controller 32A implements high-level requests from orchestration engine 30 by configuring physical switches, e.g., leaf switches 24, spine switches 22; physical routers; physical service nodes such as firewalls and load balancers; and virtual services such as virtual firewalls in a VM. SDN controller 32A maintains routing, networking, and configuration information within a state database. SDN controller 32A communicates a suitable subset of the routing information and configuration information from the state database to virtual router (VR) agents 36A-36X ("VA" in FIG. 1) on each of compute nodes 26A-26X.

Compute nodes and control nodes associated with different SDN controllers may be arranged in SDN clusters. A cluster is a group of real and/or virtual servers that form an SDN controller, including control nodes, and compute nodes managed by the SDN controller. For example, as shown in FIG. 1, a system may include two independent SDN controllers 32A and 32B, which may each be associated with a different cluster of servers. In some examples, SDN controller 32B manages a second set of compute nodes (not shown). In other examples, SDN controller 32B manages a subset of compute nodes 26, while SDN controller SDN 32A manages a different, non-overlapping subset of compute nodes 26.

Typically, the traffic between any two network devices, such as between network devices within IP fabric 20 or between compute nodes 26 and customers 4 or between compute nodes 26, for example, can traverse the physical network using many different paths. For example, there may be several different paths of equal cost between two network devices. In some cases, packets belonging to network traffic from one network device to the other may be distributed among the various possible paths using a routing strategy called multi-path routing at each network switch node. For example, the Internet Engineering Task Force (IETF) RFC 2992, "Analysis of an Equal-Cost Multi-Path Algorithm," describes a routing technique for routing packets along multiple paths of equal cost. The techniques of RFC 2992 analyze one particular multipath routing strategy involving the assignment of flows to bins by hashing packet header fields that sends all packets from a particular network flow over a single deterministic path.

For example, a "flow" can be defined by the five values used in a header of a packet, or "five-tuple," i.e., the protocol, Source IP address, Destination IP address, Source port, and Destination port that are used to route packets through the physical network. For example, the protocol specifies the communications protocol, such as TCP or UDP, and Source port and Destination port refer to source and destination ports of the connection. A set of one or more packet data units (PDUs) that match a particular flow entry represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port.

As described herein, each of compute nodes 26 include a respective virtual router ("VR" in FIG. 1) that executes multiple routing instances for corresponding virtual networks within data center 10 and routes the packets to appropriate virtual network endpoints (e.g., virtual machines) executing within the operating environment provided by the servers. Packets received by the virtual router of compute node 26A, for instance, from the underlying physical network fabric may include an outer header to allow the physical network fabric to tunnel the payload or "inner packet" to a physical network address for a network interface of compute node 26 that executes the virtual router. The outer header may include not only the physical network address of the network interface of the server but also a virtual network identifier such as a Virtual Extensible LAN (VXLAN) tag or Multiprotocol Label Switching (MPLS) label that identifies one of the virtual networks as well as the corresponding routing instance executed by the virtual router or an interface. That is, the MPLS label can map either to a routing instance or to an interface. An inner packet includes an inner header having a destination network address that conforms to the virtual network addressing space for the virtual network identified by the virtual network identifier. In some aspects, the virtual router buffers and aggregates multiple tunneled packets received from the underlying physical network fabric prior to delivery to the appropriate routing instance for the packets. As used herein, a virtual network identifier is distinct from a unique identifier for a virtual network. While the virtual network identifier is a tag or label used to segment traffic, the unique identifier for a virtual network may be a bitstring that uniquely identifies a virtual network within an orchestration domain. For example, the unique identifier for a virtual network may be a UUID assigned by an orchestrator such as orchestration engine 30.

Virtual networks are the fundamental building blocks of a given Software-Defined Networking (SDN) Enterprise Multi-cloud system. Access-control, services and connectivity between virtual networks are defined via high-level policies. The SDN Enterprise Multi-cloud system contains some conceptual similarities to standard MPLS L3 VPNs (for Layer 3 overlays) and MPLS EVPNs (for L2 overlays).

In the example of FIG. 1, SDN controller 32A learns and distributes routing and other information (such as configuration information) to all compute nodes in the data center 10. The VR agent 36 running inside the compute node, upon receiving the routing information from SDN controller 32A, typically programs the data forwarding element (virtual router) with the forwarding information. SDN controller 32A sends routing and configuration information to the VR agent 36 using a messaging protocol such as XMPP protocol. In XMPP, SDN controllers 32 and agents communicate routes and configuration over the same channel. SDN controller 32A acts as a messaging protocol client when receiving overlay network routes (virtual routes) from a VR agent 36, and the VR agent 36 acts as a messaging protocol server in that case. Conversely, SDN controller 32A acts as a messaging protocol server to the VR agent 36 as the messaging protocol client when the SDN controller sends routes to the VR agent 36, including overlay network routes learned from SDN gateways or other compute nodes.

In accordance with the techniques of this disclosure, control nodes of SDN controller 32A generate and encode route targets for virtual networks using a unique identifier of the virtual network (e.g., a UUID) that is already stored by the SDN controller. For example, in response to receiving a messaging protocol message from a compute node 26 specifying a VPN route, a control node of SDN controller 32A sends, to one or more routing protocol peers in the SDN system, a VPN route to a virtual network destination. The routing protocol peers may include, for example, an SDN gateway 8 or a control node of a different SDN cluster that is an iBGP-federated with the SDN cluster to which the SDN controller 32A belongs. Among other fields, the VPN route includes a route target field having the route target value generated by the control node. The VPN route also includes a route distinguisher field having a route distinguisher value generated by the control node. Virtual network destinations may be virtual network endpoints that are compute node workloads and may represent virtual machines and/or containers, for instance.

A route target is a type of BGP extended community. The control node of SDN controller 32A attaches a route target to every VPN route advertised, and the advertised VPN routes carrying those route targets are imported into the VRF table only if the advertised route target matches the import route target of a VRF instance.

In a typical SDN system, every virtual network created is automatically assigned a system-generated route target. The system-generated route targets start from 8000000 and are used for various SDN system features (like network policy, service chaining etc.) that involves importing/exporting routes in between VRF instances within the SDN system Domain.

A route distinguisher is an identifier attached to a route, enabling a router to distinguish to which VPN or virtual private LAN service (VPLS) the route belongs. Each routing instance may have one or more unique route distinguishers associated with it. The route distinguishers are used to place bounds around a VPN so that the same IP address prefixes can be used in different VPNs without having them overlap. If the instance type is VRF, the route distinguisher statement is required.

In some implementations, the system-generated route targets are guaranteed to be unique only within an SDN system cluster (also referred to as an "SDN cluster"). This poses a limitation when customers use internal BGP (iBGP) federated SDN system Clusters. In iBGP federated SDN system Clusters, because Autonomous System Numbers remain the same, virtual networks created on each cluster may end up having the same system-generated route target, which will result in unintended route leaking across the cluster.

As described herein, SDN controller 32A that manages a cluster of compute nodes generates a route target value based on a unique identifier of a virtual network, rather than using a system-generated route target value based on an incremented base value. SDN controller 32A may obtain the unique identifier of the virtual network from a configuration node of the SDN controller 32A, which listens for configuration updates including new virtual network objects created by the orchestration engine 30 as a new virtual network is created. SDN controller 32A attaches the route target to a VPN route when outputting an iBGP message to an iBGP session peer.

In one example, SDN controller 32A generates the value field according to a different approach depending on a route target type for the VPN route. According to one approach, SDN controller 32A computes the value field for route a target type based on the Virtual Network's 128-bit UUID, as described in further detail below, for type 0 and type 1 routes. According to another approach, a new route-target type is introduced, called Type 7, which comprises of a 2-Bytes Type field and 6-Bytes Value Field. In this manner, the issue with unintended route leaking between SDN clusters is addressed due to the very low likelihood of collisions on the system-generated route targets. The newly proposed approach for type 7 routes also helps in increasing the route target range manifold.

By generating the route target based on the UUID of the virtual network, the peer recipients of the virtual route can uniquely identify the route in more situations. In contrast, when SDN controller 32 generates a route target for a route advertised by the compute node 26 based on system-generated value, which may not be globally unique across different SDN clusters, the routing protocol peer receiving the virtual route from SND controller 32 may result in unintended route leaking across the SDN clusters.

The techniques of this disclosure may provide one or more technical advantages. For example, the receiving routing peer, such as an iBGP peer control node of an SDN controller, can properly distinguish between virtual routes (VPN routes) associated with different virtual networks in different SDN clusters that have the same autonomous system numbers. This results in the SDN gateway router 8 properly storing the routes as distinct virtual routes, rather than storing routes incorrectly based on unintended identical route target values.

In addition, the control node leverages the UUID value that is already being generated for a virtual network by orchestration engine 30 upon creating a new virtual network object. There is already a significant amount of randomness in the UUID generation. Therefore, it may be more efficient and easier to implement if SDN controller 32A uses the UUID for generating the route target value, as opposed to using an additional, separately generated random number other than the UUID as the basis for generating the route target value. Using a separately generated random number rather than the UUID would require additional configuration, as well as additional steps by SDN controller 32A. Thus, the techniques of this disclosure may reduce processing power and conserve computing resources of SDN controller 32A by eliminating unnecessary computational steps, and may reduce an amount of time needed to generate the route target.

In addition, if the receiving routing peer is also configured such that it is aware of the new route target type, the receiving routing peer could also learn the UUID of the virtual network that is implicitly contained in the received route. For example, a peer SDN controller could learn and store the unique identifier of a virtual network based on the route target of the received route, and peer SDN controller can in turn advertise the unique identifier of a virtual network.

Figure 2:
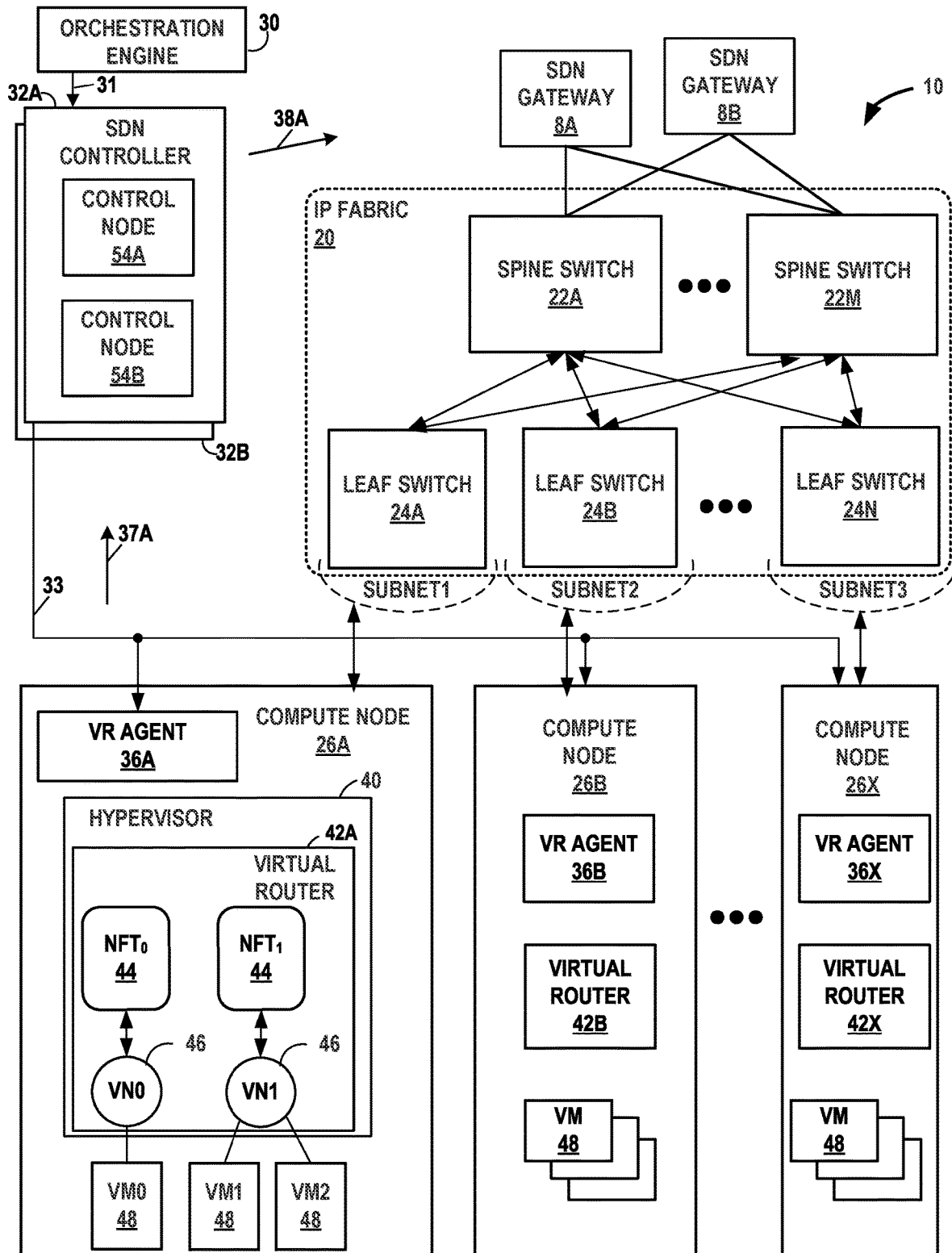
FIG. 2 is a block diagram illustrating an example implementation of the data center of FIG. 1 in further detail, in accordance with the techniques of this disclosure.

FIG. 2 is a block diagram illustrating an example implementation of data center 10 of FIG. 1 in further detail, in accordance with the techniques of this disclosure. In the example of FIG. 2, data center 10 includes compute nodes 26A-26X that include virtual routers 42A-42X (collectively, "virtual routers 42," sometimes referred to as "vrouter"). Responsive to instructions received from SDN controller 32A, virtual routers 42 dynamically create and manage one or more virtual networks ("VN1, VN0") 46 usable for communication between application instances.

In one example, virtual routers 42 execute the virtual network as an overlay network, which provides the capability to decouple an application's virtual address from a physical address (e.g., IP address) of the one of compute nodes 26A-26X ("compute nodes 26") on which the application is executing. Each virtual network may use its own addressing and security scheme and may be viewed as orthogonal from the physical network and its addressing scheme. Various techniques may be used to transport packets within and across virtual networks 46 over the physical network.

Each of virtual routers 42 executes within a hypervisor, a host operating system, or other component of each of compute nodes 26. Each of compute nodes 26 represents an x86 or other general-purpose or special-purpose server capable of executing virtual machines 48. In the example of FIG. 2, virtual router 42A executes within hypervisor 40, also often referred to as a virtual machine manager (VMM), which provides a virtualization platform that allows multiple operating systems to concurrently run on one of compute nodes 26. In the example of FIG. 2, virtual router 42A manages virtual networks 46, each of which provides a network environment for execution of one or more virtual machines (VMs) 48 on top of the virtualization platform provided by hypervisor 40. Each VM 48 is associated with one of the virtual networks VN0-VN1 and represents tenant VMs running customer applications such as Web servers, database servers, enterprise applications, or hosting virtualized services used to create service chains. In some cases, any one or more of compute nodes 26 or another computing device hosts customer applications directly, i.e., not as virtual machines. Virtual machines as referenced herein, e.g., VMs 48, compute nodes 26, or a separate computing device that hosts a customer application may be referred to alternatively as "hosts."

Each interface of VMs 48 running on the host is connected to a VRF that contains the forwarding tables for the corresponding network that contains the IP address of that interface. A vRouter only has VRFs for networks that have interfaces in them on that host, including the Fabric VRF that connects to the physical interface of the host. Virtual networking uses encapsulation tunneling to transport packets between VMs 48 on different hosts, and the encapsulation and decapsulation happens between the Fabric VRF and the VM VRFs.

In general, each of VMs 48 may be any type of software application and is assigned a virtual address for use within a corresponding virtual network 46, where each of the virtual networks may be a different virtual subnet provided by virtual router 42A. A VM 48 may be assigned its own virtual layer three (L3) IP address, for example, for sending and receiving communications, but is unaware of an IP address of the physical compute node 26A on which the virtual machine is executing. In this way, a "virtual address" is an address for an application that differs from the logical address for the underlying, physical computer system, e.g., compute node 26A in the example of FIG. 2. The virtual addresses may also be referred to herein as "virtual interfaces."

In one implementation, each of compute nodes 26 includes a corresponding one of VR agents 36A-36X that communicates with SDN controller 32A and, responsive thereto, directs virtual router 42 so as to control the overlay of virtual networks 46 and coordinate the routing of data packets within compute node 26. In general, each VR agent 36 communicates with SDN controller 32A, which generates commands to control routing of packets through data center 10.

VR agents 36 execute in user space and operate as a proxy for control plane messages between VMs 48 and SDN controller 32A. For example, a VM 48 may request to send a message using its virtual address via the VR agent 36A, and VR agent 36A may in turn send the message and request that a response to the message be received for the virtual address of the VM 48 that originated the first message. In some cases, a VM 48 invokes a procedure or function call presented by an application programming interface of VR agent 36A, and the VR agent 36A handles encapsulation of the message as well, including addressing.

In some example implementations, each compute node 26A further includes an orchestration agent (not shown in FIG. 2) that communicates directly with orchestration engine 30. For example, responsive to instructions from orchestration engine 30, the orchestration agent communicates attributes of the particular VMs 48 executing on the respective compute node 26, and may create or terminate individual VMs.

In one example, network packets, e.g., layer three (L3) IP packets or layer two (L2) Ethernet packets generated or consumed by the instances of applications executed by virtual machines 48 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed within virtual routers 42, e.g., within the hypervisor or the host operating system running on each of compute nodes 26. As another example, encapsulation and decapsulation functions are performed at the edge of IP fabric 20 at a first-hop top-of-rack (TOR) switch 24 that is one hop removed from the application instance that originated the packet. This functionality is referred to herein as tunneling and may be used within data center 10 to create one or more overlay networks. Besides IP-in-IP, other example tunneling protocols that may be used include IP over GRE, VxLAN, MPLS over GRE, MPLS over UDP, etc.

As noted above, SDN controller 32A provides a logically centralized controller for facilitating operation of one or more virtual networks within data center 10. For example, SDN controller 32A maintains a routing information base, e.g., one or more routing tables that store routing information for the physical network as well as one or more overlay networks of data center 10. Similarly, virtual routers 42 maintain routing information, such as one or more routing and/or forwarding tables. In one example implementation, virtual router 42A of hypervisor 40 implements a network forwarding table (NFT) 44 for each virtual network 46. In general, each NFT 44 stores forwarding information for the corresponding virtual network 46 and identifies where data packets are to be forwarded and whether the packets are to be encapsulated in a tunneling protocol, such as with a tunnel header that may include one or more headers for different layers of the virtual network protocol stack.

For example, virtual machine VM1-48 may send an "inner packet," to virtual router 42A by an internal link. Virtual router 42A uses NFT1 to look up a virtual network destination network address for the packet. NFT1 specifies an outbound interface for virtual router 42A and encapsulation for the packet. Virtual router 30A applies the encapsulation to add a tunnel header to generate an outer packet and outputs the outer packet on the outbound interface, in this case toward leaf switch 24A.

The routing information, for example, maps packet key information (e.g., destination IP information and other select information from packet headers) to one or more specific next hops within the networks provided by virtual routers 42 and IP fabric 20. In some cases, the next hops are chained next hops that specify a set of operations to be performed on each packet when forwarding the packet, such as may be used for flooding next hops and multicast replication. As shown in FIG. 2, each virtual network 46 provides a communication framework for encapsulated packet communications for the overlay network established through IP fabric 20. In this way, network packets associated with any of virtual machines 48 may be transported as encapsulated packet communications via the overlay network.

Each of VR agents 36 may send messages to SDN controller 32A over XMPP sessions, the messages conveying virtual routes to the virtual interfaces (virtual addresses) of the VMs of compute nodes 26. The virtual routes may also be referred to herein as overlay network routes. For example, VR agent 36A sends an XMPP message 37A containing virtual route(s) for compute node 26A. SDN controller 32A receives the messages and stores the virtual routes to overlay routing information, and may in turn advertise one or more of the overlay routes received from a first VR agent 36 to SDN gateways 8 (e.g., via Multi-Protocol extensions for BGP (MP-BGP)). MP-BGP is an extension to BGP that allows different address families to be distributed. SDN controller 32A may also advertise the overlay routes (VPN routes) to other control nodes 54, such as to a control node of SDN 32B, if there is a gateway router between the two clusters, and/or to another SDN controller (not shown) in an iBGP-federated SDN cluster. Interior BGP (iBGP) is an interior routing protocol for routing communications within a single autonomous system. IBGP-federated SDN clusters are different SDN clusters having a same autonomous system number.

In some examples, any of the virtual routes may include a prefix, a next hop address associated with a server of compute nodes 26, and a label or other data to identify a virtual routing and forwarding instance configured at the next hop server. A virtual route may also include a route distinguisher (RD) and a route target.

One example of an IP-based VPN is described more fully in Rosen et al., "BGP/MPLS IP Virtual Private Networks (VPNs)", Request for Comments 4364, Network Working Group, February 2006, the entire contents of which are incorporated by reference herein. Further details of BGP-signaled IP/VPNs are described in S. Mackie et al., "BGP-Signaled End-System IP/VPNs," Network Working Group Internet-Draft, Dec. 15, 2016, the entire contents of which are incorporated by reference herein. Multiprotocol extensions for BGP are described in T. Bates et al., "Multiprotocol Extensions for BGP-4," Request for Comments 4760, Network Working Group, January 2007, the entire contents of which are incorporated by reference herein.

The route distinguisher is an address qualifier used in the context of BGP-MPLS VPNs. The route distinguisher is used to distinguish between VPNv4 (alternatively, "VPN-IPv4") routes sent by different MP-BGP peers.

The route target is a 6-byte field. The route target is an 8-octet value consisting of two major fields, the Type Field (2 octets) and Value Field (6 octets). The type field determines how the value field should be interpreted. The following existing Types are defined as shown in Table 1:

TABLE 1

| Type number | Value |
|---|---|
| Type 0 | 2-byte ASN + 4-byte value subfield |
| Type 1 | 4-byte IP + 2-byte value subfield |
| Type 2 | 4-byte ASN + 2-byte value subfield |

With a type-2 VPN route, at a control node of the SDN controller, the /32 IP address of a VM launched inside a virtual node is added onto the VRF corresponding to the virtual node (VN). The VRF will have the usual attributes like the Route-Target (RT) and Route Distinguisher (RD).

Every control node of the SDN controller advertises the XMPP routes received from the compute nodes towards other BGP speakers as VPNv4 routes, e.g., route advertisement 38A. The BGP speakers can include other control nodes 54 as well as external BGP speakers such as SDN gateway routers 8.

The SDN architecture described herein supports separation of control-data and management interfaces. It is assumed that the management interfaces are assigned an IP address which is reachable from the outside world and needs to be unique. However, the control-data network is taken from the private addressing space and is local to the cluster. This can be reused across multiple independent clusters.

The architecture of data center 10 illustrated in FIG. 2 is shown for purposes of example only. The techniques as set forth in this disclosure may be implemented in the example data center 10 of FIG. 2, as well as other types of data centers not described specifically herein. Nothing in this disclosure should be construed to limit the techniques of this disclosure to the example architecture illustrated by FIG. 2.

Figure 3:
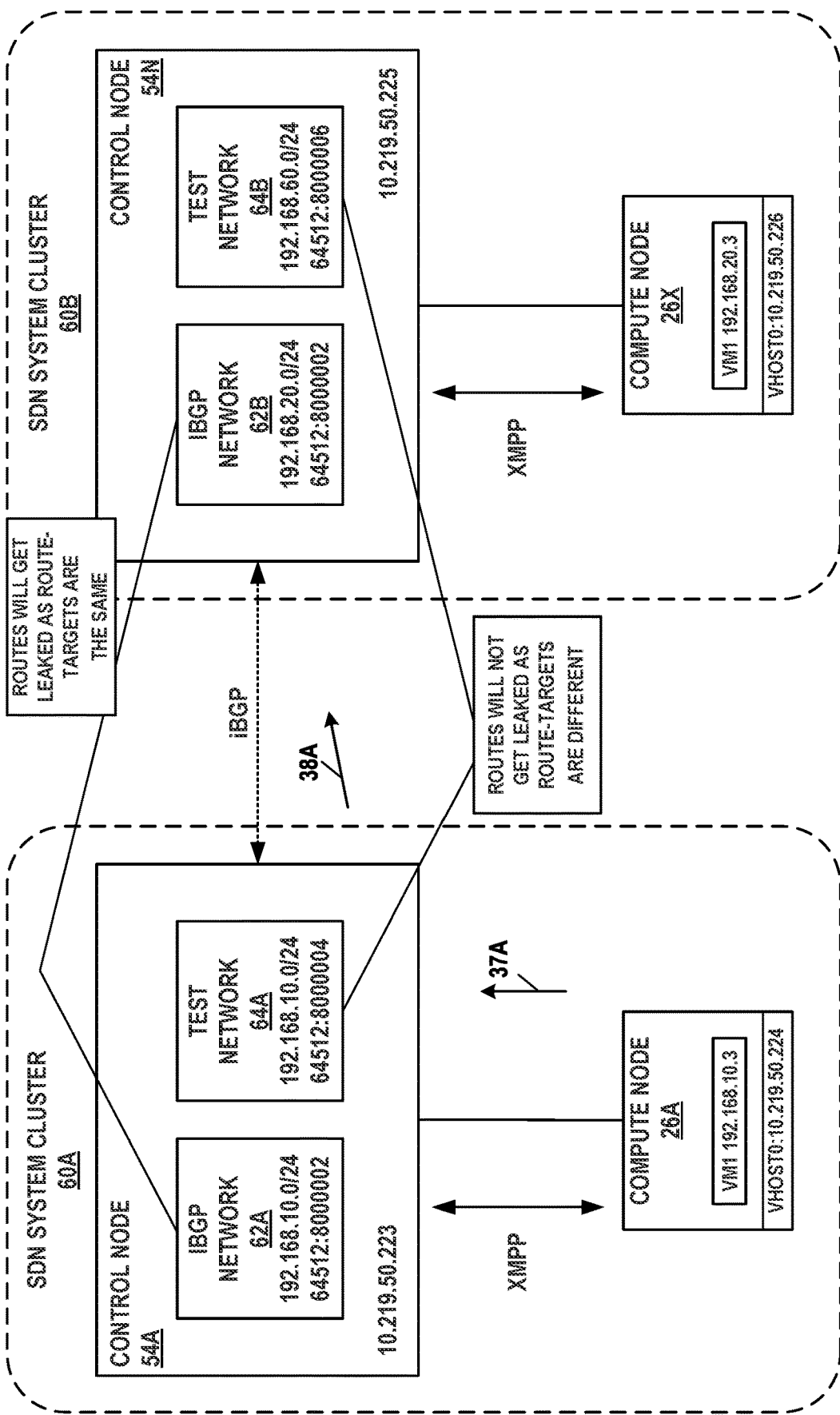
FIG. 3 is a block diagram illustrating an example of control nodes advertising VPN routes in the data center of FIG. 2, in accordance with the techniques of this disclosure.

FIG. 3 is a block diagram illustrating an example of control nodes advertising VPN routes in the data center of FIG. 2, in accordance with the techniques of this disclosure. FIG. 3 illustrates control nodes 54A, 54N, that exchange an iBGP message 38A that includes a route target generated in accordance with the techniques of this disclosure. The example system of FIG. 3 illustrates two SDN system Clusters:

1. SDN system Cluster 60A made up of:
   a. Control Node 54A—10.219.50.223
   b. Compute Node 26A—10.219.50.224
2. SDN system Cluster 60B made up of:
   a. Control Node 54N—10.219.50.225
   b. Compute Node 26X—10.219.50.226

In the absence of the techniques of this disclosure, the system-generated route target for ibgp1-network belonging to SDN system Cluster 60A is target:64512:8000002, and the system-generated route target for ibgp2-network belonging to SDN system Cluster 60B is also target:64512:8000002.

In case of an iBGP federated cluster in which SDN system clusters 60A and 60B are part of a single autonomous system, the customer would be adding each control node to the federated SDN system cluster as an "External Control Node." As soon as that is done, the iBGP neighborship between control node 60A and control node 60B will be in ESTABLISHED state. Since system generated route target across the iBGP federated cluster are the same, routes in the corresponding VRFs are leaked between these two clusters and data path is stitched. The data communication between workloads on the federated clusters will work if there is L2/L3 reachability between the compute nodes hosting the respective workloads.

Due to this, the data path is stitched and the workloads belonging to two different virtual networks across different SDN system clusters can communicate with each other if there is L2/L3 reachability between the compute nodes hosting the respective workloads.

This disclosure proposes the following approaches to address this problem. In each approach, the route target value is generated based at least in part on using a checksum value of the unique identifier of the virtual network.

Approach 1: Compute the value field for route-target type based on the Virtual Network's 128-bit UUID. For Type 0: The value field is of length 32 bits (4 Bytes). Here is what can be done to generate a route target for this case: obtain a cyclic redundancy check (CRC) checksum value of the unique identifier of the virtual network; truncate the CRC checksum value to a size determined by a route target type for the virtual private network route; determine an integer value of the truncated CRC checksum value; and assign the route target value based on the integer value.

For example:
a. With value field holding 32 bits, the range of the value field can be from 1-4,294,967,295
b. Retrieve the Virtual Network's UUID for a Virtual Network on which Type 0 route-target should be computed. The UUID generated is 128-bits in length.
c. Obtain CRC64 of 128-bit UUID using the ECMA polynomial.
d. The CRC64 checksum obtained from Step b) is 64-bits (8 Bytes).
e. Truncate the CRC check value to four bytes of the CRC check value (e.g., take the first 32-bits (4 Bytes)) and take base 16 integer through int (string, 16)
f. Use the outcome of Step e) as the route target for the virtual network.

For Type 2: The value field is of length 16 bits (2 Bytes). Here is what can be done to obtain a route target for this case:
a. With value field holding 16 bits, the range of the value field can be from 1-65535
b. Retrieve the Virtual Network's UUID for a Virtual Network on which Type 2 route-target should be computed. The UUID generated is 128-bits in length.
c. Get CRC64 of 128-bit UUID using the ECMA polynomial.
d. The CRC64 checksum obtained from Step b) is 64-bits (8 Bytes).
e. truncate the CRC check value to two bytes of the CRC check value (Take the first 16-bits (2 Bytes)) and take base 16 integer through int (string, 16)
f. Use the outcome of Step e) as the route target for the virtual network.

Approach 2: Introduce a new route-target type—say Type 7, which comprises of a 2-Bytes Type field and 6-Bytes Value Field. The value field is of length 48 bits (6 Bytes). Here is what can be done to obtain a route target for this case:
a. With value field holding 48 bits, the range of the value field can be from 1-2,81,474,976,710,656
b. Retrieve the Virtual Network's UUID for a Virtual Network on which Type 0 route-target should be computed. The UUID generated is 128-bits in length.
c. Obtain CRC64 of 128-bit UUID using the ECMA polynomial.
d. The CRC64 checksum obtained from Step b) is 64-bits (8 Bytes).
e. Truncate the CRC check value to six bytes of the CRC check value (Take the first 48-bits (6 Bytes)) and take base 16 integer through int (string, 16)
f. Use the outcome of Step e) as the route target for the virtual network.

Currently, the SDN Enterprise Multicloud system supports the above 64-bit route-target types. Type 0 is the default route target type in SDN system. Regardless of the choice, the computed route target is unique and chances of collisions are very rare within and outside the cluster. By computing unique route targets within the autonomous system of SDN system clusters 60A and 60B, this solution will prevent unintended route leaking across the federated clusters.

The techniques described herein address both the 2-byte and the 4-byte autonomous system solutions.

The techniques described herein may also be more secure as compared to some implementations, since the route target values generated as described herein are not predictable. With a different implementation in some SDN systems, the route-target value starts from 8000000 and is sequential in nature (increments by one for every virtual network created). A third party can potentially predict the route target and can configure the predicted value for its own VRF's import route target.

An alternative option is to use a random number generated by a random number generator as a basis for the route target, instead of using the UUID. Though this may address the problem, it is not as efficient as leveraging the UUID value that is a unique value already obtained by the SDN controller in response to detecting a new virtual network object created by the orchestration engine. The UUID is already generated by the orchestration engine, and available to the SDN controller.

To overcome the route target collision issue completely, this disclosure proposes changing the generation of the route target value by control nodes 54. Rather than using the system-generated route target value, the techniques described herein use a UUID of the virtual network. For some examples, the control node 54 may advertise the route target using both the administrator field and the sub-administrator field for a 6-byte route target value generated based on the UUID. This will be advertised as a new type-7 RD route, as shown in Table 2. In this manner, a Type value of the Type field can indicate that the Value field is generated based on the unique identifier of the virtual network. A receiving device uses this information to interpret the received message. While the new route target type is described with respect to type value 7, another value may be used. Values for route target route types are assigned by the Internet Assigned Numbers Authority (IANA).

TABLE 2

| Type (2-bytes) | Value (6-bytes) |
| --- | --- |
| New value - 7 | Value generated based on UUID |

Although described for purposes of example in terms of SDN clusters (a collection of control node server(s) and compute node server(s)), in some examples, the techniques of this disclosure can be applied in systems that do not necessarily involve multiple SDN clusters. For example, one VM in a cluster may need to communicate with a bare metal server (BMS) that is managed by some routing device. In this case, the techniques of this disclosure can apply to VM-to-BMS communications.

Figure 4:
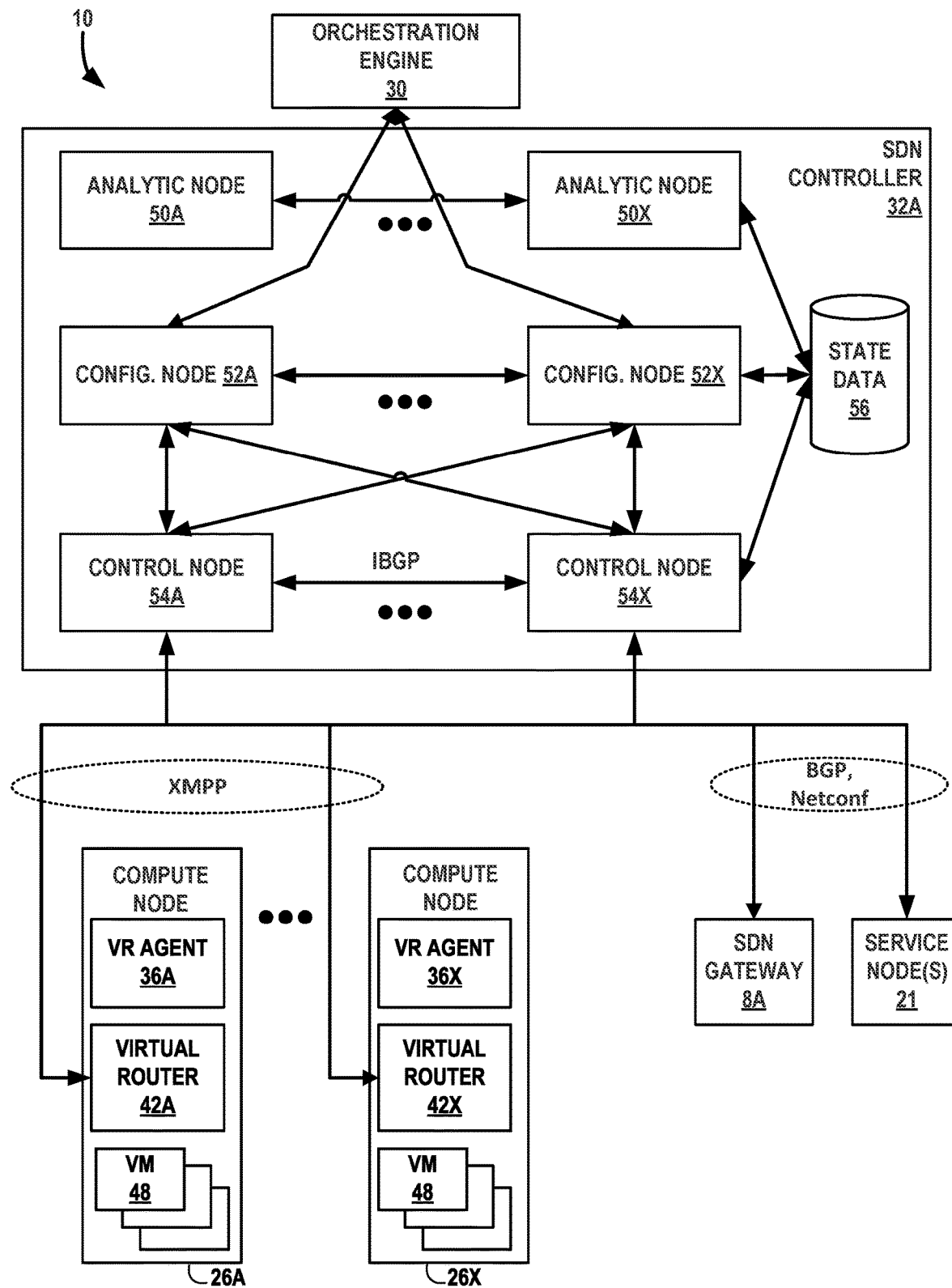
FIG. 4 is a block diagram illustrating an example implementation of the data center of FIG. 2 in further detail.

FIG. 4 is a block diagram illustrating an example implementation of the data center of FIG. 2 in further detail. In the example of FIG. 4, SDN controller 32A includes one or more analytic nodes 50A-50X (collectively, "analytic nodes 50"), one or more configuration nodes 52A-52X (collectively, "configuration nodes 52") and control nodes 54A-54X (collectively, "control nodes 54"). In general, each of the nodes 50, 52, and 52 may be implemented as a separate software process, and the nodes may be distributed across multiple hardware computing platforms that provide an environment for execution of the software. Moreover, each of the nodes maintains state database 56, which may be stored within a centralized or distributed database. In some examples, state database 56 is a NoSQL database. In some examples, state database 56 is a database cluster.

In general, analytic nodes 50 are tasked with collecting, storing, correlating, and analyzing information from virtual and physical network elements within data center 10. This information may include statistics, logs, events, and errors for use in managing the routing and network configuration of data center 10. Analytic nodes 50 store this information in state database 56.

Configuration nodes 52 translate the high-level data model of orchestration engine 30 into lower-level models suitable for interacting with network elements, such as physical switches 22, 24 and VR agents 36. Configuration nodes 52 keep a persistent copy of the configuration state of SDN controller 32A within state database 56 ("STATE DATA 56").

Control nodes 54 implement a logically centralized control plane responsible for maintaining ephemeral network state. Control nodes 54 interact with each other and with network elements, such as VR agents 36 and virtual routers 42 of compute nodes 26, to ensure that the network state is eventually consistent with desired state as specified by orchestration engine 30. In general, control nodes 54 receive configuration state information of SDN controller 32A from configuration nodes 52, and exchange routes with each other via iBGP to ensure that all control nodes 54 have the same network state. In a network architecture in which multiple SDN clusters are federated over iBGP, control nodes 54 exchange VPN routes via iBGP sessions with one or more control nodes of other BGP clusters. Further, control nodes 54 exchange routes with VR agents 36 on compute nodes 26 via XMPP.

Control nodes 54 also communicate the configuration state information, such as routing instances and forwarding policy, to VR agents 36, e.g., via XMPP, for installation within respective virtual routers 42. In some examples, control nodes 54 may proxy traffic on behalf of compute nodes 26. These proxy requests may be received over XMPP. Further, control nodes 54 exchange routes with SDN gateway 8A via BGP, and exchanges the configuration state of SDN controller 32A with service nodes 21 via Netconf.

Configuration nodes 52 provide a discovery service that customers 4 may use to locate various services available within the network. For example, if VR agent 36A attempts a connection with control node 54A, it uses a discovery service provided by configuration nodes 52 to discover the IP address of control node 54A. Clients executing on VMs 48 may use local configuration, DHCP or DNS to locate the service discovery server within configuration nodes 52.

In some examples, configuration nodes 52 present a northbound API that interfaces with orchestration engine 30. Orchestration engine 30 uses this interface to install configuration state using the high-level data model. Configuration nodes 52 further include a message bus to facilitate communications amongst internal components. Configuration nodes 52 further include a transformer that discovers changes in the high-level model of orchestration engine 30 and transforms these changes into corresponding changes in the low-level data model managed by SDN controller 32A. Configuration nodes 52 further include an IF-MAP server that provides a southbound API to push computed low-level configuration down to control nodes 54.

Furthermore, configuration nodes 52 include a distributed applications manager used to allocate unique object identifiers, and to implement transactions across data center 10. For example, upon creation of a new virtual network, orchestration engine 30 creates a virtual network object and UUID, and one or more of configuration nodes 52 detects the new virtual network object and assign a VN-ID to the new virtual network. VN-ID is a 2-byte ID generated by the config node and sent to the control node. This is different from the UUID generated by the orchestration engine 30. For example, in the case of orchestration engine 30 being an OpenStack orchestrator, the transformer "listens" for new OpenStack objects created by the OpenStack orchestrator. When a person creates a virtual network object in OpenStack, OpenStack generates the UUID for the virtual network object. Configuration nodes 52 learns the UUID of a virtual network object in this manner, and saves the UUID to state data 56. Each OpenStack object has a corresponding universally unique identifier, which may be stored in state data 56.

As described herein, each of control nodes 54 is configured to generate, based on a unique identifier (e.g., the UUID) of a virtual network, a route target value for the virtual network, and output a VPN route that includes the route target value and a network address associated with a compute node. The control node outputs the VPN route to one or more BGP sessions, including an iBGP session to an iBGP-federated peer such as a control node in a different SDN cluster.

The architecture of data center 10 illustrated in FIG. 4 is shown for purposes of example only. The techniques as set forth in this disclosure may be implemented in the example data center 10 of FIG. 4, as well as other types of data centers not described specifically herein. Nothing in this disclosure should be construed to limit the techniques of this disclosure to the example architecture illustrated by FIG. 4.

Figure 5:
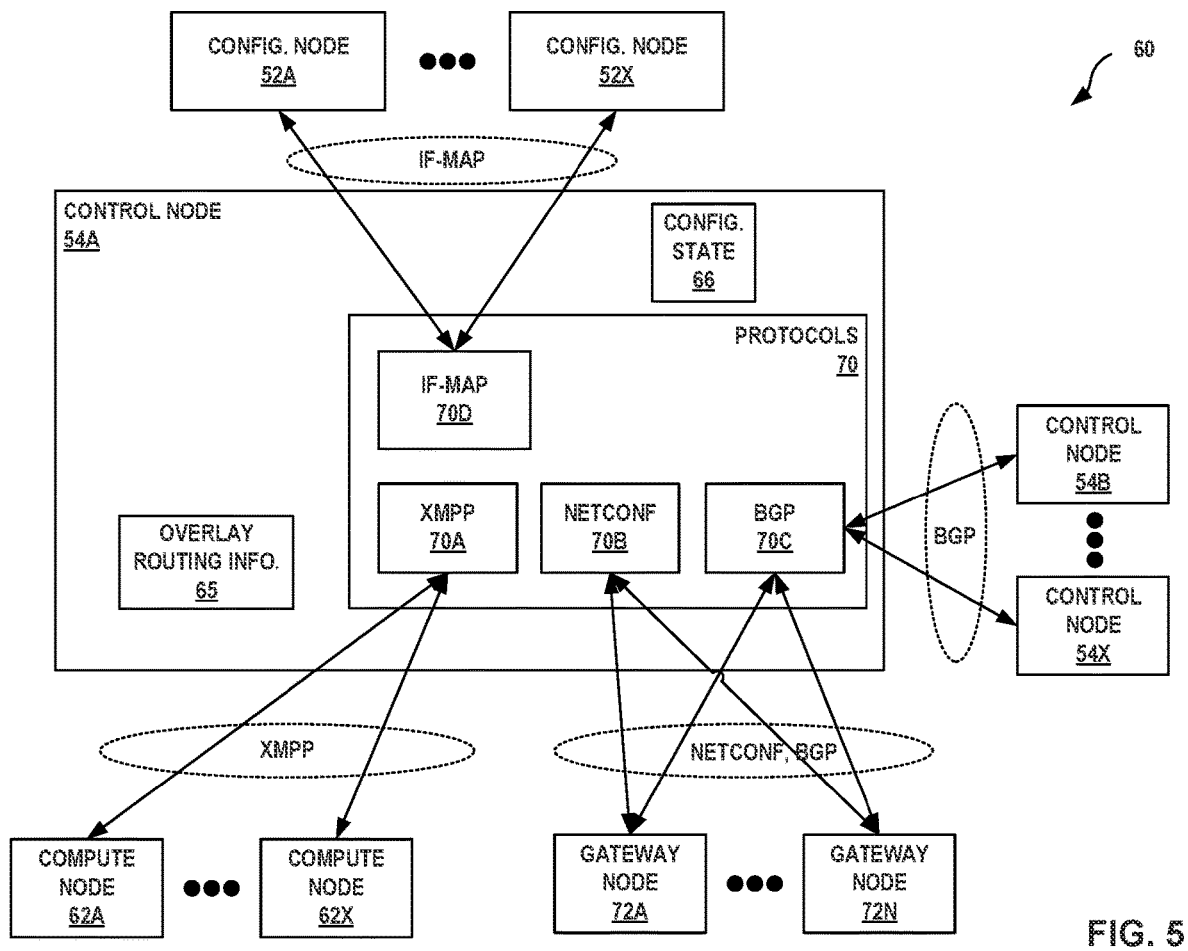
FIG. 5 is a block diagram illustrating an example of a control node of an SDN controller in further detail in accordance with the techniques of this disclosure.

FIG. 5 is a block diagram illustrating an example of a control node of an SDN controller in further detail in accordance with the techniques of this disclosure. Control node 54 is configured to communicate with multiple other types of nodes, including configuration nodes 52A-52X ("config. nodes 52"), other control nodes 54B-54X, compute nodes 62A-62X ("compute nodes 62"), and gateway nodes 72A-72N ("gateway nodes"). Control node 54 also communicates with IP fabric 20, which, as described herein, may be made up of devices including spine switches and leaf switches, for example. Control node 54A provides an operating environment for protocols 70 to execute. Protocols 70 may include, for example, an XMPP process 70A, a NETCONF process 70B, a BGP process 70C, and an IF-MAP process 70D.

The control nodes receive configuration state from the configuration nodes using IF-MAP. The control nodes exchange overlay network routes with other control nodes using IBGP to ensure that all control nodes have the same overlay network state. The control nodes exchange overlay network routes (e.g., VPN routes) with the vRouter agents on the compute nodes using XMPP. The control nodes also use XMPP to send configuration state such as routing instances and forwarding policy. The control nodes proxy certain kinds of traffic on behalf of compute nodes. These proxy requests are also received over XMPP. The control nodes exchange overlay network routes with the gateway nodes (routers and switches) using BGP. The control nodes also send configuration state using NETCONF.

Control node 54A receives configuration information from one or more of config. nodes 52 using Interface to Metadata Access Points (IF-MAP) process 70D. IF-MAP process 70D may include circuitry for executing software instructions for sending and receiving communications from config nodes 52 in accordance with the IF-MAP protocol. IF-MAP process 70D stores the configuration information received from configuration nodes 52 to configuration state 66 ("CONFIG. STATE 66").

Control node 54A exchanges BGP messages with BGP peers, including control nodes 54B-54X and gateway nodes 72 using BGP process 70C. Gateway nodes 72 may include one or more SDN routers such as SDN gateways 8. BGP process 70C may implement multi-protocol BGP (MP-BGP), for example. BGP process 70C may include circuitry for executing software instructions for sending and receiving BGP messages with control nodes 54B-54X in accordance with the BGP protocol, including MP-BGP update messages. BGP process 70C stores overlay network routes received from BGP route advertisements from gateway nodes 72 and control nodes 54B-54X to overlay routing information 65.

Control node 54A exchanges messages with compute nodes using XMPP process 70A in accordance with XMPP. Control node 54A exchanges the messages via XMPP sessions. Compute nodes 62 may correspond to compute nodes 26 of FIGS. 1-3. XMPP process 70A may include circuitry for executing software instructions for exchanging XMPP messages with compute nodes 62 in accordance with the XMPP protocol. XMPP is described in further detail in P. Saint-Andre, Extensible Messaging and Presence Protocol (XMPP): Core, IETF RFC 6120, March 2011, the entire contents of which is incorporated by reference herein. Control node 54A (and more specifically, XMPP process 70A of control node 54A) may serve as an XMPP client or an XMPP server relative to one of compute nodes 62, depending on the context. For example, control node 54A may act as an XMPP server, and compute nodes 62 may be XMPP clients that subscribe to information published by control node 54A, such as configuration information from configuration state 66 for individual compute nodes 62 and routing information from overlay routing information 65 that pertains to individual compute nodes 62.

As another example, control node 54A may act as an XMPP client to one or more of compute nodes 62 as XMPP servers, in which control node 54A subscribes to information published by compute nodes 62, such as routing information learned by compute nodes 62 from other sources. XMPP process 70A receives overlay network routes from compute nodes 62A via an XMPP session and stores the overlay network routes to overlay routing information 65. Overlay network routes learned by XMPP process 70A may be leaked to BGP process 70C, and BGP process 70C in turn may send to its BGP peers (e.g., other control nodes or SDN gateways) BGP route advertisements that advertise the overlay network routes (VPN routes) in overlay routing information 65 learned from compute nodes 62 via XMPP. In some examples, NETCONF process 70B of control node 54A enables control node 54A to communicate with gateway nodes 72 via the NetConf protocol.

In response to XMPP process 70A receiving an XMPP message from one of compute nodes 62 advertising a VPN route associated with a new virtual network endpoint on the one of compute nodes 62, BGP process 70C generates a route advertisement based on the XMPP message that includes a VPN route for the new virtual network endpoint. A virtual network endpoint may be, for example, a virtual machine or a container. For example, this handoff may occur due to the leaking of overlay network routes learned by XMPP process 70A as described above. Control node 54A generates a route target value in accordance with the techniques described herein, based on the unique identifier of a virtual network that includes the new virtual network endpoint. BGP process 70C saves the route target value to overlay routing information 65 and includes the generated route target value for the virtual network in the route advertisement. Control node 54A outputs the route advertisement to one or more of control nodes 54B-54X and/or to other control nodes not shown, such as via iBGP sessions. In some examples, control node 54A can generate and output a route advertisement having a route target generated as described herein, independent of receiving an XMPP message from a control node.

In some examples, IF-MAP messages received by control node 54A from configuration nodes 52 may specify a unique identifier (e.g., a UUID) of a virtual network, upon configuration node 52 detecting creation of a new virtual network object. Control node 54A may store the UUIDs specified in the XMPP messages, such as to config state 66. Similarly, if the virtual network is subsequently deleted, control node 54A may receive an IF-MAP message from configuration node 52A indicating the virtual network object has been deleted. Virtual network endpoints that were part of the deleted virtual network will also be deleted. Control node 54A updates config. state 66 to reflect the detected configuration changes, and may output a new iBGP route advertisement to BGP peers indicating that the VPN route to the virtual network endpoint has been withdrawn. The VPN route will similarly include the route target value generated as described herein, based on the UUID of the virtual network that is deleted.

As one example, for Type 0 route target values, BGP process 70C may generate the route target values according to the following steps, with example values.

Type0—Value is of length 32 bits (Range is 1-4,294,967,295)
   a. Assume the UUID of a virtual network during generation is 5f3c3397-706f-47e6-a40b-01a48ef7632c.
   b. Take cyclic redundancy check (CRC) 64 checksum of the 128 bits UUID 5f3c3397-706f-47e6-a40b-01a48ef7632c using the ECMA Polynomial (European Computer Manufacturers Association). The CRC64 checksum of the UUID in Step a) would be e6420603c8cae941 (For example, https://crc64.online could be used for this conversion).
   c. Truncate the CRC checksum value to a size determined by a route target type for the virtual private network route. For example, the first 4 bytes from the CRC64 checksum will be e6420603.
   d. Compute the base 16 integer of the hexadecimal value in Step c):
   >>>int ("e6420603", 16)
   3,863,086,595
   e. Assign target:64512:3863086595 as the route-target for the virtual network in question.

As another example, for Type 2 route target values, BGP process 70C may generate the route target values according to the following steps, with example values.

Type2—Value is of length 16 bits (Range is 1-65535)
   a. Assume the UUID of a virtual network during generation is 14185dd7-9b01-4cf7-94fa-1dcb1201bbac.
   b. Get cyclic redundancy check (CRC) CRC64 checksum of the 128 bits UUID 14185dd7-9b01-4cf7-94fa-1dcb1201bbac using the ECMA Polynomial. The CRC-64 algorithm converts a variable-length string into a 16-character string. The CRC64 checksum of the UUID in Step a) would be d0c44c8f58db4a09.
   c. Truncate the CRC checksum value to a size determined by a route target type for the virtual private network route. For example, for the Type2 route target, the first 2 bytes from the CRC64 checksum will be d0c4.
   d. Compute the base 16 integer of the value in Step c):
   >>>int ("d0c4", 16)
   53444
   e. Assign target:64512:53444 as route-target for the virtual network in question.

As a further example, for Type 7 route target values, BGP process 70C may generate the route target values according to the following steps, with example values.

Type 7—Value field is reserved to be of length 48 bits in this newly introduced type (Range is 1—2,81,474,976,710,656).
   a. Assume the UUID of a virtual network during generation is 7e03def7-dfea-4850-beb9-b57e6d4e4060.
   b. Obtain a CRC64 checksum of the 128 bits UUID 7e03def7-dfea-4850-beb9-b57e6d4e4060 using the ECMA Polynomial. The CRC64 checksum of the UUID in Step a) would be 13ee423a4bc7e821.
   c. Truncate the CRC checksum value to a size determined by a route target type for the virtual private network route. For example, the first 6 bytes from the CRC64 checksum will be 13ee423a4bc7.
   d. Compute the base 16 integer of this value in Step c):
   >>>int ("13ee423a4bc7", 16)
   21914034260935
   e. Assign target:64512:21914034260935 as route-target for the virtual network in question.

In this manner, the control node leverages the UUID value that is already being generated for a virtual network by the configuration nodes of the SDN controller upon detecting the new virtual network object. There is already a significant amount of randomness in the UUID generation. Therefore, it may be more efficient and easier to implement if the control node uses the UUID for generating the route target value, as opposed to using an additional, separately generated random number other than the UUID as the basis for generating the route target value. Using a separately generated random number rather than the UUID would require additional configuration and code changes, as well as additional steps on the control nodes. Thus, the techniques of this disclosure may reduce processing power and conserve computing resources of the control nodes of the SDN controller by eliminating unnecessary computational steps, and may reduce an amount of time needed to generate the route target.

In some examples, control node 54A may also generate a route distinguisher value for the VPN route based on a physical hardware address of a compute node, as described in U.S. application Ser. No. 16/933,684, filed Jul. 20, 2020, entitled GENERATING ROUTE DISTINGUISHERS FOR VIRTUAL PRIVATE NETWORK ADDRESSES BASED ON PHYSICAL HARDWARE ADDRESSES, the entire contents of which are incorporated by reference herein.

Figure 6A:
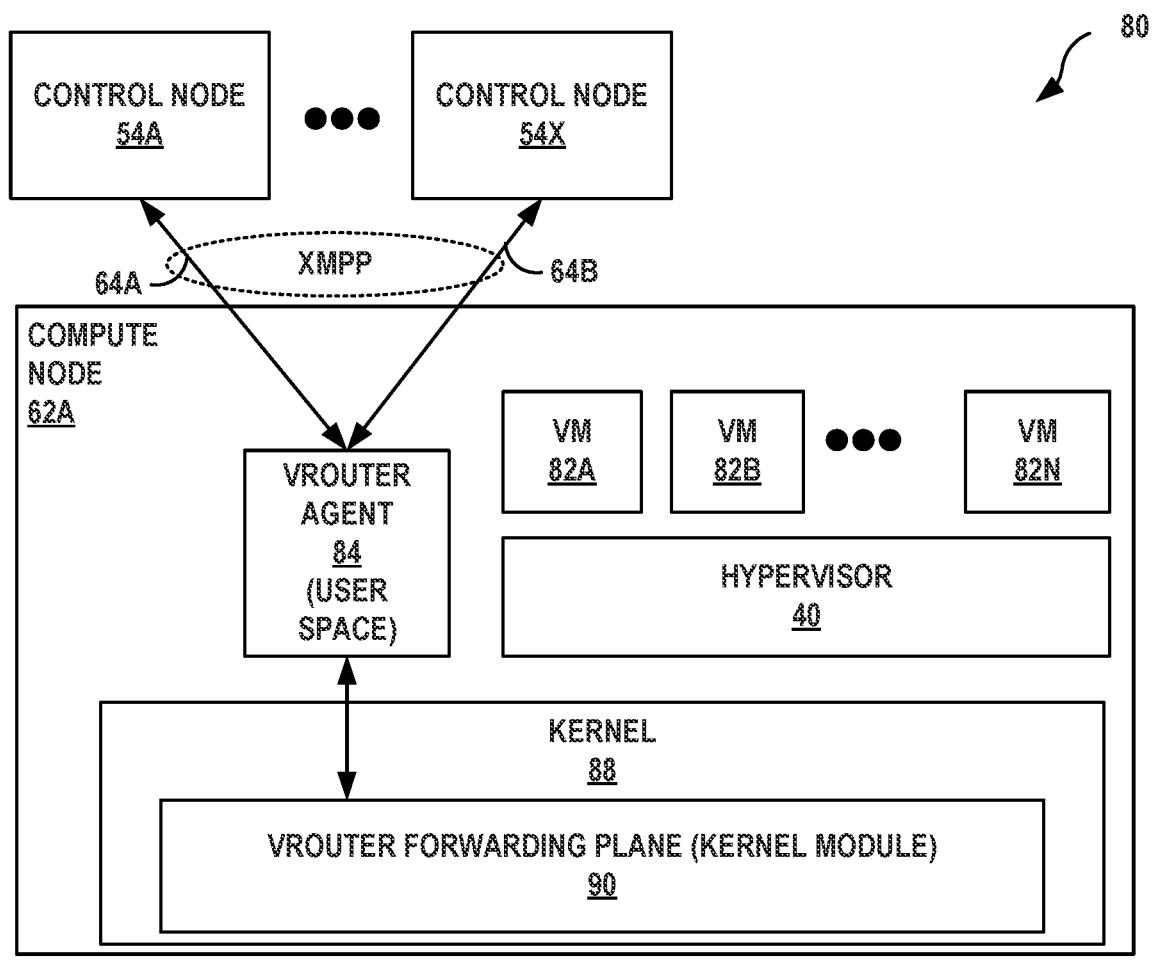
FIGS. 6A-6B are block diagrams illustrating examples of a compute node in further detail, in accordance with the techniques of this disclosure.
Figure 6B:
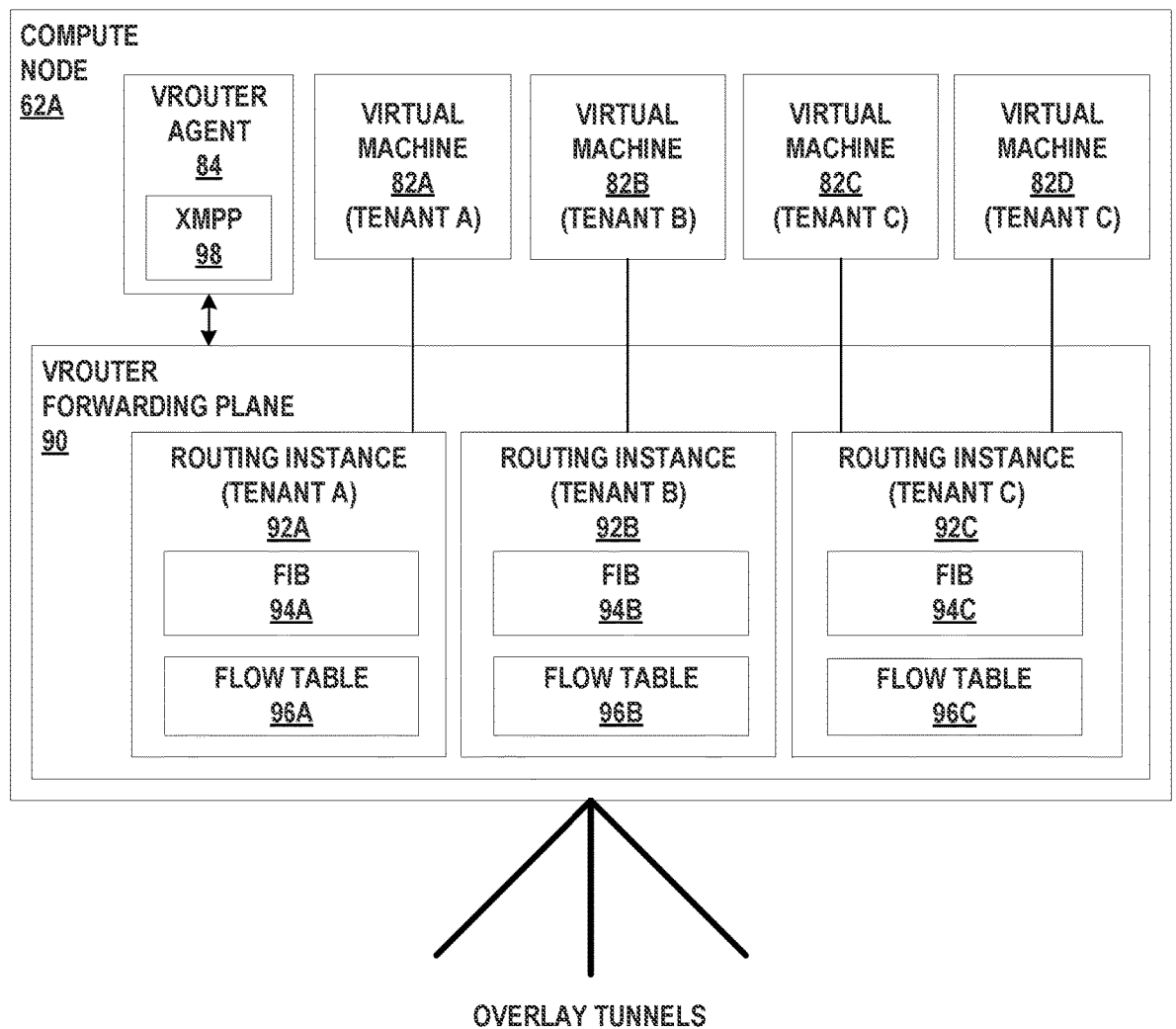

FIGS. 6A-6B are block diagrams illustrating examples of a compute node in further detail, in accordance with the techniques of this disclosure. In the example of FIGS. 6A-6B, the compute node is compute node 62A of FIG. 5. Compute node 62A may be one of compute nodes 26 of FIGS. 1-4. Compute node 62A hosts VMs 82A-82N ("VMs 82"), and may be, for example, a general-purpose x86 server. VMs 82 are tenant VMs running customer applications such as Web servers, database servers, enterprise applications or hosting virtualized services used to create service chains, for example. In one example configuration, Linux is the host operating system (OS).

Two components in a compute node implement a virtual router; namely, the vRouter agent 84 and the vRouter forwarding plane 90. The vRouter forwarding plane 90 is located in the kernel (e.g., Linux), and the vRouter agent 84 is the local control plane.

The vRouter agent 84 is a user space process running inside the kernel. The vRouter agent 84 acts as the local, lightweight control plane and is responsible for the following functions. The vRouter agent 84 exchanges control state such as routes with the control nodes 54 using XMPP sessions. The vRouter agent 84 receives low-level configuration state such as routing instances and forwarding policy from the control nodes 54 using XMPP. The vRouter agent 84 reports analytics state such as logs, statistics, and events to the analytics nodes 50 (FIG. 3). The vRouter agent 84 installs forwarding state into the vRouter forwarding plane 90. The vRouter agent 84 may discover the existence and attributes of VMs in cooperation with a Nova agent of compute node 62A (not shown). The vRouter agent 84 applies forwarding policy for the first packet of each new flow and installs a flow entry for the flow in the flow table of the forwarding plane. The vRouter agent 84 may proxy one or more of DHCP, ARP, DNS, and MDNS, for example. Additional proxies may be included in some implementations. Each vRouter agent 84 is connected to at least two control nodes 54 for redundancy in an active-active redundancy model.

FIG. 6B illustrates the virtual router ("vRouter") forwarding plane 90 of compute node 62A in further detail. The vRouter forwarding plane 90 runs as a loadable kernel process (e.g., in Linux). The vRouter forwarding plane 90 is responsible for the following functions: vRouter forwarding plane 90 enables encapsulating packets to be sent to the overlay network and decapsulating packets to be received from the overlay network.

Routing instances 92A-92C, for respective tenants A, B, and C, represent virtual routing and forwarding instances ("VRFs"). Routing instances 92A-92C ("routing instances 92") include corresponding FIBs 94A-94C ("FIBs 94") and flow tables 96A-96C ("flow tables 96"). VRouter forwarding plane 90 may include an additional VRF called a "fabric VRF" (not shown). The vRouter forwarding plane 90 assigns packets to a routing instance 94. Packets received from the overlay network are assigned to a routing instance based on the MPLS label or Virtual Network Identifier (VNI). Virtual interfaces to local virtual machines are bound to routing instances 92. The vRouter forwarding plane 90 does a lookup of the destination address in the forwarding information base (FIB) 94, also known as a forwarding table, and forwards the packet to the correct destination. The routes may be Layer 3 IP prefixes or Layer 2 MAC addresses, for example. A MAC address for a control-data interface of compute node 62A may be stored in one or more of the routing instances 92.

A forwarding policy can be applied using a flow table 96: The vRouter forwarding plane 90 matches packets against the flow table and applies the flow actions. The vRouter forwarding plane 90 sends the packets for which no flow rule is found (that is, the first packet of every flow) to the vRouter agent 84, which then installs a rule in the flow table 96. The vRouter forwarding plane 90 sends certain packets such as DHCP, ARP, MDNS to the vRouter agent for proxying.

Each interface of VMs 82 running on the host is connected to a VRF (routing instance 92) that contains the forwarding tables for the corresponding network that contains the IP address of that interface. A vRouter only has VRFs for networks that have interfaces in them on that host, including the Fabric VRF that connects to the physical interface of the host. Virtual networking uses encapsulation tunneling to transport packets between VMs 82 on different hosts, and the encapsulation and decapsulation happens between the Fabric VRF and the VM VRFs (routing instances 92).

When a new virtual workload is created, an event is seen in the orchestration engine 30 and sent into SDN controller 32A, which then sends requests to the vRouter agent 84 for routes to be installed in the VRFs for virtual networks, and the vRouter agent 84 then configures them in the forwarder.

The logical flow for configuring networking on a new VM with a single interface is as follows: Networks and network policies are defined in either the orchestrator/orchestration engine or Networking using user interface, command line interface, or REST application programming interface (API). A network is primarily defined as a pool of IP addresses which will be allocated to interfaces when VMs are created.

A VM is requested to be launched by a user of the orchestrator, including which network its interface is in. The orchestrator selects a host for the new VM to run on, and instructs the vRouter agent 84 on that host to fetch its image and start the VM. Events or API calls are received from the networking service of the orchestrator instructing to set up the networking for the interface of the new VM that will be started. These instructions are converted into REST calls and sent to the SDN controller 32. The SDN controller 32 sends a request to the vRouter agent 84 for the new VM virtual interface to be connected to the specified virtual network. The vRouter agent 84 instructs the vRouter forwarding plane 90 to connect the VM interface to the routing instance 92 for the virtual network. The routing instance 92 (VRF) is created, if not present, and the interface is connected to it.

The vRouter agent 84 starts the VM which will usually be configured to request IP addresses for each of its interfaces using DHCP. The vRouter agent 84 proxies the DHCP requests and responds with the interface IP, default gateway, and DNS server addresses. Once the interface is active and has an IP address from DHCP, the vRouter agent 84 will install routes to the VM's IP address and MAC address with a next hop of the VM virtual interface. The vRouter agent 84 assigns a label for the interface and installs a label route in the MPLS table (e.g., FIB 94).

VRouter agent 84 uses XMPP process 98 to establish an XMPP session with a control node of the SDN controller. XMPP process 98 of vRouter agent 84 learns overlay network routes to virtual interfaces (virtual addresses) from VMs 82, and stores these as virtual routes for the virtual interfaces to FIBs 94. XMPP process 98 sends XMPP messages via the XMPP session to control nodes 54 to advertise the overlay network routes (VPN routes). For example, the vRouter agent 84 sends an XMPP message 37A to the SDN controller 32 containing a VPN route to the new VM. The route has a next hop of a network address of the server that the vRouter is running on (e.g., an IP address including IPv4 or IPv6), and specifies an encapsulation protocol using the label that was just allocated.

The control node of the SDN controller 32 distributes the VPN route to the new VM to the other vRouters with VMs in the same network and in other networks, as allowed by network policy. The SDN controller sends routes for the other VMs, as allowed by policy, to the vRouter of the new VM. For example, the vRouter agent 84 XMPP process 98 receives virtual routes advertised by SDN controller's control node 54A, and stores the overlay network routes to overlay routing information 104 and one or more of FIBs 94. At the end of this procedure, the routes in the VRFs of all the vRouters in the data center have been updated to implement the configured network policies, taking account of the new VM.

Figure 7:
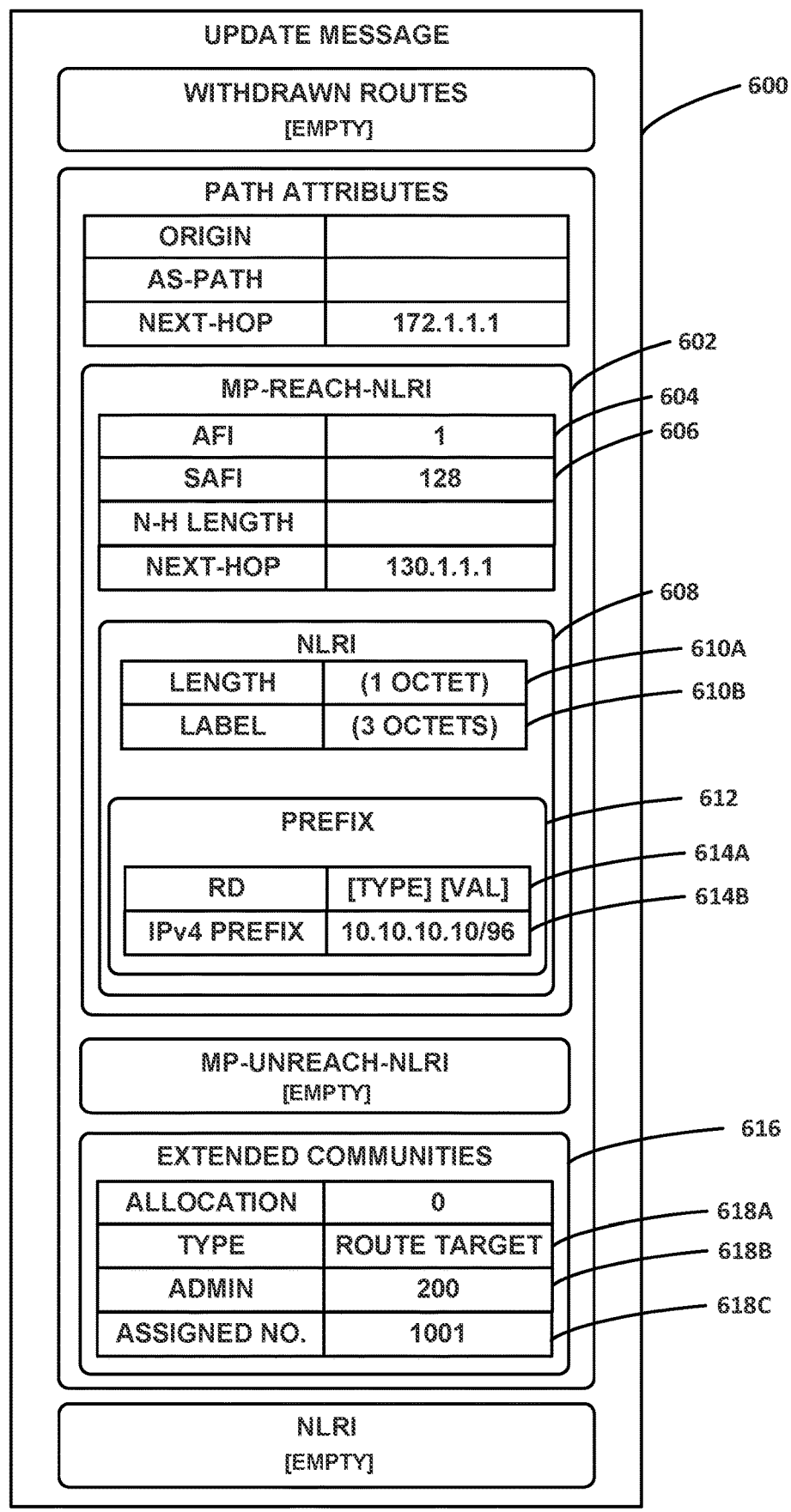
FIG. 7 is a block diagram illustrating an example route advertisement for a virtual private network address that includes, in accordance with techniques described herein, a route target generated based on a unique identifier of a virtual network.

FIG. 7 is a block diagram illustrating an example route advertisement for a virtual private network address that includes, in accordance with techniques described herein, a route target generated based on a unique identifier associated with a virtual network. BGP UPDATE message 600 is a route advertisement that conforms to MP-BGP and includes MP-REACH-NLRI field 602 advertising a host route for a virtual machine in a compute node of a distributed SDN system. Extended BGP UPDATE message 600 may represent an example instance of route advertisement 38A illustrated in FIG. 2. For purposes of illustration, extended BGP UPDATE message 600 is illustrated using glyphs, rather than with packet fields.

MP-REACH-NLRI field 602 of extended BGP UPDATE message 600 specifies an Address Family Identifier (AFI) field 604 having a value of 1 in this example to indicate IPv4 network addresses, along with a value for the Subsequent AFI (SAFI) field 606 having a value of 128 to identify the virtual route as a L3 VPN route. AFI field 604 and SAFI field 606 may in some instances have different values, as assigned by a private party or by the Internet Assigned Numbers Authority (IANA). In some examples, an IPv6 prefix may be used instead of an IPv4 prefix.

Network Layer Reachability Information (NLRI) field 608 specifies a host route for the compute node virtual machine having IP address 10.10.10.10, identified in prefix field 612. Length field 610A specifies a length of the prefix value in prefix field 612. Label field 610B specifies an MPLS label. Prefix field 612 includes a route distinguisher field 614A that specifies a route distinguisher value generated by the control node originating BGP UPDATE message 600. The route distinguisher field 614A may also specify a Type field and a Value field of the route distinguisher field 614A. The IPv4 prefix field 614B specifies a value of the IPv4 prefix.

In the example of FIG. 7, extended communities field 616 includes a Type field 618A that specifies a Route Target Type. A route target is a particular type of extended community. An Administrative field 618B specifies an autonomous system number, e.g., 200 in the example of FIG. 7. An Assigned Number ("ASSIGNED NO.") FIELD 618C includes a route target value generated by the control node originating BGP UPDATE message 600, in accordance with the techniques of this disclosure. A process by which a BGP process generates the route target value may vary depending on the route target type, as described in various examples herein. In some examples, the route target type will have a value (e.g., 7) to specify that the route carries a route target generated based on a unique identifier of the network address, as described herein.

Figure 8:
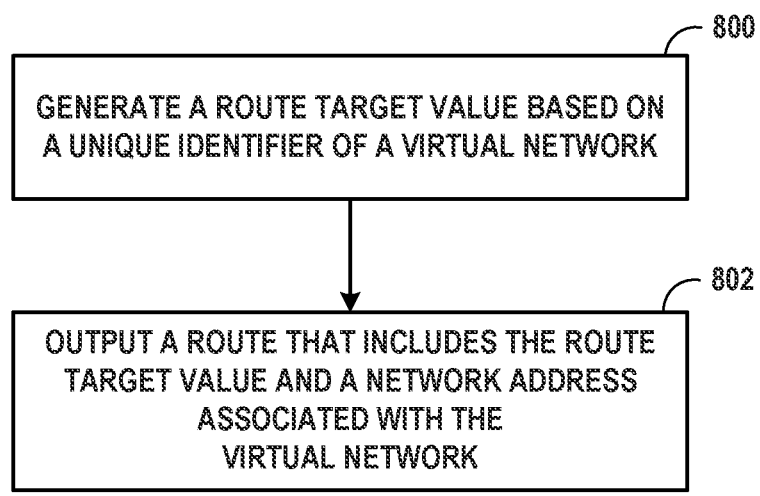
FIG. 8 is a flowchart illustrating example operation of an SDN controller in accordance with the techniques of this disclosure.

FIG. 8 is a flowchart illustrating example operation of an SDN controller in accordance with the techniques of this disclosure. FIG. 8 may illustrate example operation of an SDN controller such as SDN controller 32A or 32B of FIG. 1-2 or 4, for example. FIG. 8 may illustrate example operation of a control node 54A-54N of FIGS. 3-5, for example. An SDN controller that manages a cluster of compute nodes generates, based on a unique identifier of a virtual network, a route target value for the virtual network, wherein the virtual network comprises virtual network endpoints executing on the compute nodes (800).

The control node of the SDN controller outputs to a routing protocol peer device a virtual private network (VPN) route that includes the route target value for the virtual network and a virtual network prefix associated with the virtual network, the VPN route for routing to the compute nodes executing the virtual network endpoints of the virtual network (802). For example, the VPN route may be a route advertisement in accordance with a routing protocol, such as BGP UPDATE message 600 of FIG. 7. The VPN route may be a VPNv4 route.

The SDN controller may output the VPN route to a second SDN controller via an interior border gateway protocol, wherein the second SDN controller manages a second plurality of compute nodes, the second plurality of compute nodes and the second SDN controller together forming a second SDN system cluster. The second SDN system cluster and the first SDN system cluster may be part of a single autonomous system. The unique identifier of the virtual network is unique within the single autonomous system.

In some examples, the unique identifier of the virtual network is a 128-bit UUID value generated by a network orchestrator for a new virtual network object associated with the virtual network upon creation of the virtual network. A configuration node of the SDN controller can detect existence of the new virtual network object and obtain the unique identifier for the virtual network from the network orchestrator.

Although described for purposes of example in terms of an SDN controller, in some examples the techniques of FIG. 8 may be implemented by a network device other than an SDN controller. While the techniques are described primarily with respect to advertising virtual network addresses for virtual machines executing on compute nodes, the techniques are similarly applicable to other types of workloads, such as containers. For instance, a container may execute as part of a pod workload on a compute node, the pod being assigned a virtual network address by the SDN platform and operating as a virtual network destination.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, process or components may be implemented together or separately as discrete but interoperable logic devices. Depiction of different features as process or units is intended to highlight different functional aspects and does not necessarily imply that such process or units must be realized by separate hardware or software components. Rather, functionality associated with one or more process or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

What is claimed is:

1. A method comprising:

receiving, by a software-defined networking (SDN) controller that manages a plurality of compute nodes, a unique identifier of a virtual network from a network orchestrator;

generating, by the SDN controller and based on the unique identifier of the virtual network, a route target value for the virtual network, wherein the virtual network comprises virtual network endpoints executing on the compute nodes; and outputting, by the SDN controller and to a routing protocol peer device, a virtual private network (VPN) route that includes the route target value for the virtual network and a virtual network prefix associated with the virtual network, the VPN route for routing to the plurality of compute nodes executing the virtual network endpoints of the virtual network.

2. The method of claim 1, wherein the SDN controller comprises a first SDN controller, wherein the plurality of compute nodes comprises a first plurality of compute nodes, wherein the first plurality of compute nodes and the first SDN controller together comprises a first SDN system cluster, wherein outputting the VPN route comprises outputting the VPN route to a second SDN controller via an interior border gateway protocol, wherein the second SDN controller manages a second plurality of compute nodes, wherein the second plurality of compute nodes and the second SDN controller together comprise a second SDN system cluster, the second SDN system cluster and the first SDN system cluster being part of a single autonomous system, wherein the unique identifier of the virtual network is unique within the single autonomous system.

3. The method of claim 1, wherein the unique identifier of the virtual network comprises a 128-bit value generated by the network orchestrator for a new virtual network object associated with the virtual network upon creation of the virtual network, the method further comprising detecting, by the SDN controller, existence of the new virtual network object and obtaining the unique identifier for the virtual network from the network orchestrator.

4. The method of claim 1, wherein generating the route target value comprises generating the route target value based at least in part on using a checksum value of the unique identifier of the virtual network.

5. The method of claim 1, wherein generating the route target value comprises:
obtaining a cyclic redundancy check (CRC) checksum value of the unique identifier of the virtual network;
truncating the CRC checksum value to a size determined by a route target type for the virtual private network route;
determining an integer value of the truncated CRC checksum value; and
assigning the route target value based on the integer value.

6. The method of claim 5, further comprising:
wherein when the route target type for the virtual private network route is Type 0, truncating comprises truncating the CRC check value to four bytes of the CRC check value, and
wherein the route target value comprises the four bytes.

7. The method of claim 5, further comprising:
wherein when the route target type for the virtual private network route is Type 2, truncating comprises truncating the CRC check value to two bytes of the CRC check value, and
wherein the route target value comprises the two bytes.

8. The method of claim 5, further comprising:
wherein when the route target type for the virtual private network route is Type 7, truncating comprises truncating the CRC check value to six bytes of the CRC check value, and wherein the route target value comprises the six bytes.

9. The method of claim 1, wherein the route includes a route target field that specifies a Type field and a Value field, wherein a Type value of the Type field indicates that the Value field is generated based on the unique identifier of the virtual network.

10. The method of claim 1, further comprising:
wherein generating the route target value comprises generating the route target value in response to receiving, from a compute node managed by the SDN controller and via a messaging protocol, a messaging protocol message that specifies the VPN route.

11. The method of claim 10, wherein the messaging protocol comprises Extensible Messaging and Presence Protocol (XMPP), and wherein the messaging protocol message is received via an XMPP session between the SDN controller and a virtual router agent of the compute node, and wherein outputting the route comprises outputting the route via an Interior Border Gateway Protocol (iBGP) session between the SDN controller and a routing protocol peer device.

12. A software-defined networking (SDN) controller comprising processing circuitry in communication with a memory, the processing circuitry being configured to:
generate, based on a unique identifier of a virtual network received by the SDN controller from a network orchestrator, a route target value for the virtual network, wherein the virtual network comprises virtual network endpoints executing on one or more of a plurality of compute nodes managed by the SDN controller; and
output a virtual private network (VPN) route that includes the route target value for the virtual network and a virtual network address prefix associated with the virtual network, the VPN route for routing to the plurality of compute nodes executing the virtual network endpoints of the virtual network.

13. The SDN controller of claim 12, wherein the SDN controller comprises a first SDN controller, wherein the plurality of compute nodes comprises a first plurality of compute nodes, wherein the first plurality of compute nodes and the first SDN controller together comprises a first SDN system cluster,
wherein to output the VPN route comprises outputting the VPN route to a second SDN controller via an interior border gateway protocol, wherein the second SDN controller manages a second plurality of compute nodes, wherein the second plurality of compute nodes and the second SDN controller together comprise a second SDN system cluster, the second SDN system cluster and the first SDN system cluster being part of a single autonomous system,
wherein the unique identifier of the virtual network is unique within the single autonomous system.

14. The SDN controller of claim 12, wherein the unique identifier of the virtual network comprises a universally unique identifier generated by the network orchestrator for a new virtual network object associated with the virtual network upon creation of the virtual network,
wherein the processing circuitry is further configured to:
detect existence of the new virtual network object; and
obtain the unique identifier for the virtual network from the network orchestrator.

15. The SDN controller of claim 12, wherein to generate the route target value comprises generating the route target value based at least in part on using a checksum value of the unique identifier of the virtual network.

16. The SDN controller of claim 12, wherein the processing circuitry being configured to generate the route target value comprises the processing circuitry being configured to:
obtain a cyclic redundancy check (CRC) checksum value of the unique identifier of the virtual network;
truncate the CRC checksum value to a size determined by a route target type for the virtual private network route;
determine an integer value of the truncated CRC checksum value; and
assign the route target value based on the integer value.

17. The SDN controller of claim 12, wherein the processing circuitry being configured to generate the route target value comprises the processing circuitry being configured to:
generate the route target value in response to receiving, from a compute node managed by the SDN controller and via a messaging protocol, a messaging protocol message that specifies the VPN route.

18. The SDN controller of claim 12, wherein the VPN route includes a route target field that specifies a Type field and a Value field, wherein a Type value of the Type field indicates that the Value field is generated based on the unique identifier of the virtual network.

19. A non-transitory computer-readable storage medium comprising having stored thereon instructions that, when executed, cause one or more processors of a software-defined networking (SDN) controller to:
- receive a unique identifier of a virtual network from a network orchestrator;
- generate, based on a unique identifier of a virtual network, a route target value for the virtual network, wherein the virtual network comprises virtual network endpoints executing on one or more of a plurality of compute nodes managed by the SDN controller; and
- output, to a routing protocol peer device, a virtual private network (VPN) route that includes the route target value for the virtual network and a virtual network address prefix associated with the virtual network, the VPN route for routing to the plurality of compute nodes executing the virtual network endpoints of the virtual network.

20. The SDN controller of claim 12, wherein the unique identifier of the virtual network is logically based on a unique identifier of a Virtual Routing and Forwarding instance (VRF) used to implement the virtual network.

* * * * *